United States Patent
Stüven et al.

(10) Patent No.: US 11,644,403 B2
(45) Date of Patent: May 9, 2023

(54) METHOD AND DEVICE FOR ANALYZING THE INTERACTION BETWEEN A SURFACE OF A SAMPLE AND A LIQUID

(71) Applicant: KRÜSS GmbH, Wissenschaftliche Laborgeräte, Hamburg (DE)

(72) Inventors: Tim Kristjan Stüven, Hamburg (DE); Bernd Friedrich, Hasloh (DE); Alexander Buchholz, Norderstedt (DE); Marlitt Jönsson, Hamburg (DE); Florian Weser, Hamburg (DE)

(73) Assignee: Kruss GmbH, Wissenschaftliche Laborgerate, Hamburg (DE)

( * ) Notice: Subject to any disclaimer, the term of this patent is extended or adjusted under 35 U.S.C. 154(b) by 84 days.

(21) Appl. No.: 17/320,457

(22) Filed: May 14, 2021

(65) Prior Publication Data

US 2021/0356372 A1 Nov. 18, 2021

(30) Foreign Application Priority Data

May 14, 2020 (EP) .................................... 20174707

(51) Int. Cl.
  *G01N 13/02* (2006.01)
  *G01B 11/14* (2006.01)
  (Continued)

(52) U.S. Cl.
  CPC .......... *G01N 13/02* (2013.01); *G01B 11/026* (2013.01); *G01B 11/03* (2013.01); *G01B 11/08* (2013.01);
  (Continued)

(58) Field of Classification Search
  CPC .................. G01N 13/00; G01N 13/02; G01N 2013/0208; G01B 11/026; G01B 11/03;
  (Continued)

(56) References Cited

U.S. PATENT DOCUMENTS

| 7,486,403 B2 * | 2/2009 | Osaka | ................ G01N 15/1463 356/239.8 |
| 8,474,306 B1 * | 7/2013 | Behroozi | ............... G01N 13/02 73/64.52 |

(Continued)

FOREIGN PATENT DOCUMENTS

| JP | 2007132929 A | 5/2007 | |
| KR | 1020160117206 A | 10/2016 | |
| WO | WO-2015058927 A1 * | 4/2015 | ............. G01B 11/24 |

OTHER PUBLICATIONS

EP Application No. 20 174 707.8: filed May 14. 2020; European Search Report dated Nov. 5, 2020 (7 pages).

*Primary Examiner* — Gordon J Stock, Jr.
(74) *Attorney, Agent, or Firm* — Barclay Damon LLP (57) ABSTRACT

A method for analyzing an interaction between a sample surface and a drop of liquid comprises applying the drop of liquid to the sample surface and illuminating the drop of liquid using at least two light sources. The at least two light sources are each arranged at a light source position surrounding the drop of liquid. Light reflected from the drop of liquid detecting and a sensor position on a sensor of a camera is determined for each detected light reflection. Light source positions are assigned to individual light source positions. A position of the drop of liquid is calculated relative to the sensor and an item of size information of the drop of liquid is determined. The position and the item of size information are calculated from the pairs of one sensor position and one associated light source position.

16 Claims, 3 Drawing Sheets

(51) Int. Cl.
*G01N 13/00* (2006.01)
*G06V 10/75* (2022.01)
*G01B 11/02* (2006.01)
*G01B 11/03* (2006.01)
*G01B 11/08* (2006.01)
*G01B 11/26* (2006.01)

(52) U.S. Cl.
CPC .............. *G01B 11/14* (2013.01); *G01B 11/26* (2013.01); *G01N 13/00* (2013.01); *G06V 10/751* (2022.01); *G01N 2013/0208* (2013.01)

(58) Field of Classification Search
CPC ......... G01B 11/08; G01B 11/14; G01B 11/22; G01B 11/24; G01B 11/2408; G01B 11/25; G01B 11/26; G06V 10/14; G06V 10/147; G06V 10/60; G06V 10/751
See application file for complete search history.

(56) References Cited

U.S. PATENT DOCUMENTS

| | | | |
|---|---|---|---|
| 9,423,245 | B2 | 8/2016 | Keranen et al. |
| 10,226,202 | B2* | 3/2019 | Takeshita ................. G06T 7/20 |
| 2009/0180106 | A1* | 7/2009 | Friedrich ............. G01B 11/255 |
| | | | 356/138 |
| 2015/0211973 | A1* | 7/2015 | Friedrich ............... G01N 13/02 |
| | | | 73/64.52 |
| 2017/0103280 | A1 | 4/2017 | Kusumi et al. |
| 2018/0283856 | A1* | 10/2018 | Suemasu ................ B41J 2/0456 |
| 2019/0285530 | A1* | 9/2019 | Behroozi ................. G06T 7/62 |
| 2020/0080880 | A1* | 3/2020 | Dillingham ............... G06T 7/62 |
| 2021/0018417 | A1* | 1/2021 | Neumann Barros Ferreira ......... |
| | | | G01N 13/00 |

* cited by examiner

METHOD AND DEVICE FOR ANALYZING THE INTERACTION BETWEEN A SURFACE OF A SAMPLE AND A LIQUID

CROSS REFERENCE TO RELATED INVENTION

This application is based upon and claims priority to, under relevant sections of 35 U.S.C. § 119, European Patent Application No. 20 174 707.8, filed May 14, 2020, the entire contents of which are hereby incorporated by reference.

TECHNICAL FIELD

The invention relates to a method and a device for analyzing the interaction between a surface of a sample and a liquid, in which a drop of the liquid is applied to the sample surface and measured. Methods of this kind provide information about the surface properties of the sample, because these properties determine the interaction with the applied liquid.

BACKGROUND

One parameter that is frequently used in this context and that characterizes the surface properties is the so-called contact angle, which is formed in contact with a defined test liquid. In order to determine the contact angle, DE 197 54 765 C1, for example, discloses a method in which a shadow image of the drop is captured from a lateral viewing direction. The outline of the drop and the boundary surface to the sample are visible in the shadow image, allowing the contact angle to be directly discerned from the shadow image. However, the boundary surface and drop outline are not always clearly visible in the shadow image, which can lead to inaccuracies. Additionally, automated evaluation is only possible to a limited extent. In order to produce reliable results, an experienced operator is generally needed.

In another known method, the contact angle of a drop is calculated based on a known volume of the drop and a diameter of the drop detected from above by means of a camera. The distance between the camera and the drop must be known in order to determine the exact diameter. Furthermore, relatively significant errors occur with large contact angles, because the diameter of the drop changes only slightly with the contact angle in the case of large contact angles.

Document EP 2 093 557 B1 discloses another method for determining the contact angle in which the drop is also viewed from above using a camera. Two light sources are arranged at a lateral distance from an optical axis of the camera on which the drop must be located. Images of the light reflections of the light sources are taken using the camera. The distance between the associated image points and the optical axis is evaluated. If the distance to the sample surface is known, this item of distance information can be used to calculate the radius of the drop. However, the exact arrangement of the drop and/or sample surface relative to the measuring system must be known.

Methods for determining the volume of drops of ink are known from the document JP 2007132929 A. The drops of ink are dosed into a drop receptacle using a dosing unit, then the drop receptacle with the drop is transported to an observation unit. A further method for determining the volume of a drop of ink is also known from the document KR 2016 0117206 A.

The document DE 10 2017 007 301 A1 describes a method by means of which a contact angle of a drop of water on a surface of a fruit can be determined in order to distinguish fruits treated with surfactants and pesticides from untreated fruits. It also mentions a concept for determining the curvature and the contact angle of the drop by means of reflection points.

Proceeding from this, it is the object of the invention to provide a method for analyzing the interaction between a surface of a sample and a liquid, which method can be applied in a particularly flexible and simple manner, and to provide a corresponding device.

BRIEF SUMMARY OF THE INVENTION

An embodiment of the method comprises (a) applying a drop of a liquid to a sample surface and (b) illuminating the drop using several light sources each arranged at a light source position in the surroundings of the drop. In step (c), light reflections of the light sources emanating from the drop are detected using a camera, wherein a sensor position on a sensor of the camera is determined for each detected light reflection. Individual light source positions are assigned to individual sensor positions in step (d), such that pairs each of one sensor position and one associated light source position are provided. A position and an item of size information of the drop are calculated from the pairs in step (e).

In an embodiment, the drop may be applied to the sample surface in any desired manner, in particular using a suitable dosing apparatus. For example, the drop may be formed so as to hang from a tube and be deposited on the sample surface by lowering the tube until it is close to the sample surface. The tube can then be withdrawn. Equally, it is known to apply the drop using a liquid jet, as described, for example, in document EP 2 899 528 B1 by the applicant. The volume of the applied drop is typically in the range of 0.1 µl to 20 µl, often approximately 1 µl.

In another embodiment, the drop is illuminated using several light sources. Each of the light sources is located at a specific light source position, and therefore the arrangement of the light sources relative to the camera is known. All light sources are arranged in the surroundings of the drop, in particular such that the light emanating from the light sources strikes the drop. The distances between the light sources and the drop depend on the position of the drop. They may be the same or vary. Typically, the distances are in a range of 1 mm to 50 mm.

The light sources may be realized in different ways, for example with approximately punctiform light sources or using large-area light sources in conjunction with suitable apertures. It is also possible to use large-area light screens with targeted control of individual pixels or groups of individual pixels. The generation of the light reflections merely depends on each light source having a limited spatial extent and being surrounded on all sides by dark regions. The light sources must also be arranged at a spatial distance from one another in order to be clearly distinguishable from one another. Under these conditions, light reflections are produced by means of reflection on the surface of the drop and they are shown as clearly demarcated illuminated regions on the sensor such that one sensor position can be determined for each light reflection to be incorporated into the evaluation.

In another embodiment, light reflections of the light sources emanating from the drop are detected using a camera, which comprises a sensor. For example, the camera may be a CCD camera. The camera also comprises a lens, by means of which the field of view captured by the camera can be imaged onto the sensor. The prerequisite for producing the light reflections is that the drop surface at least partially reflects the light incident from the light sources. This is true for most liquids, in particular the test liquids typically used to characterize samples. A transparent liquid or a non-transparent, e.g. colored, liquid may be used as the test liquid.

One sensor position can be determined for each light reflection detected. Said sensor position for example consists of two-dimensional coordinates of the image of the light reflection on the sensor surface. Depending on the geometry of the light source, its arrangement and its brightness distribution as well as the reflection properties and geometric properties of the drop surface, the image of a light reflection on the sensor may be approximately punctiform or more or less extensive. If it extends over several image points of the sensor, the sensor position on which further evaluation is based can be calculated from the brightness distribution, for example as that of the brightest image point or of a center or centroid of the brightness distribution.

Therefore, after the light reflections have been detected, there are several sensor positions that each represent one of the detected light reflections. It is understood that additional light reflections may occur that are imaged onto the sensor but that are not incorporated into the evaluation. Sensor positions are not necessarily determined for these additional light reflections.

In an embodiment, individual light source positions are assigned to individual sensor positions. This assignment produces pairs of sensor positions and associated light source positions. These are important for the further evaluation, because they make it possible to draw conclusions on the drop surface on which the light reflected from the relevant light source is reflected. The light sources may be assigned to the individual sensor positions in different ways; in the following, various examples will be discussed.

The disclosed method offers different options with regard to the number of light sources and light reflections. In principle, two pairs of sensor positions and associated light source positions are required for the calculation of the position and an item of size information of the drop from the pairs. However, the accuracy can be increased if a larger number of pairs is used, for example at least three pairs, at least four pairs, at least five pairs, or at least ten pairs. This is possible, on the one hand, by increasing the number of light sources, i.e. for example by using more than two light sources, in particular three, four, five or more than five light sources. Another option consists in using additional cameras. If, for example, the light reflections from two light sources are detected by two cameras, a total of four pairs of sensor positions and associated light source positions are available for the further evaluation.

In an embodiment, a position and an item of size information of the drop are calculated from the pairs. The position may for example be a center of the drop and the item of size information may for example be a radius of the drop. Depending on the geometry of the drop or the mathematical model used for the geometry of the drop, the item of size information may instead be a different quantity that describes the surface geometry of the drop, for example a semiaxis of an ellipsis, a diameter, a volume, a height, or another quantity derived, for example, from these quantities and that describes the shape of the drop.

Which specific calculation steps are performed for calculating the position and item of size information of the drop depends, inter alia, on the number of light sources used and their arrangement as well as on the mathematical models used for the drop geometry. Some examples for possible calculation methods are explained below in detail. The central commonality of the calculation step is that both the position of the drop and the item of size information can be calculated based on the pairs. The basis for this is the assignment of individual light source positions to individual sensor positions made in the preceding method step. Therefore, both the arrangement of the drop relative to the measuring system and the desired item of size information can be determined based solely on the detected light reflections. This is a major advantage of the method, since, unlike the methods known from the prior art, neither the distance between the measuring system and the sample surface nor the arrangement of the drop relative to the measuring system, for example in relation to an optical axis of the camera, needs to be precisely controlled. Therefore, the method can be carried out much more flexibly, in particular when it comes to irregularly shaped sample surfaces. Sources of error in the measuring methods known from the prior art that result from incorrect positioning of the drop are therefore excluded from the outset. The requirements regarding the application of the drop are also less stringent and can be fulfilled by personnel with less specialized knowledge if necessary. Another advantage of the method is that the evaluation can take place in a largely automated manner. Manual execution or control of individual evaluation steps is not required. The method can therefore be carried out in a particularly simple manner.

In one embodiment, the light sources are formed by discrete lamps. The lamps may for example be LEDs. Each lamp is fastened at a defined light source position. As already mentioned, the light sources may, in principle, be configured in a variety of ways, it even being possible to use large-area light screens, individual subregions of which form the light sources. In this case, the exact arrangement of the light sources is produced by correspondingly controlling the light screen. However, the use of discrete lamps is particularly simple and can provide light sources with a relatively high light intensity and clearly defined brightness distributions.

In one embodiment, a template that shows the expected sensor positions of the light reflections is created based on the light source positions, wherein the detected light reflections are compared with the template (individual light source positions are assigned to individual sensor positions, such that pairs each of one sensor position and one associated light source position are provided). The light source positions in relation to the camera are known. In order to produce a template, an image that corresponds to the camera image can be calculated, for example based on the assumption that a typical drop is arranged at a typical position. This calculated image is a template that shows the expected sensor positions of the light reflections. If a camera image of a real drop is later captured when the method is carried out, this image can be compared with the template in a template-matching step in order to assign the detected light reflections or respectively the associated sensor positions to the individual light source positions. This approach is very helpful in practice, because the real, captured camera images frequently show light reflections that do not or do not exclusively come from the surface of the drop. This applies, in particular, to the use of samples having specularly reflective surfaces or to the use of a transparent liquid. Particularly complex reflections are produced when a transparent liquid is used on a specularly reflective sample surface. In this case, light rays penetrating into the drop may be reflected on a boundary surface of the drop, in particular between the sample and the drop, potentially several times. This produces camera images which show numerous light reflections even when a small number of light sources are used. The assignment of the light reflections that actually come from the surface of the drop to the individual light source positions can then be substantially facilitated by using a template.

In one embodiment, the steps (b) and (c) are repeated for individual light sources and/or different groups of individual light sources. On account of this measure, the assignment of the detected light reflections to the light source positions can also be simplified, because only the light reflections of individual light sources or groups of individual light sources and not all light sources are detected at a specific point in time. The individual light sources can be activated and deactivated, in particular by switching them on and off, for the successive execution of steps (b) and (c).

In one embodiment, a single light source is contained in at least two of the different groups of individual light sources. By comparing the captured camera images of the two different groups of individual light sources, it is then particularly easy to establish which light reflections come from the light source contained in both different groups.

In one embodiment, a plurality of normal vectors that describe possible arrangements of a reflecting surface region are calculated in step (e) for each of the pairs. The specular reflection on the surface of the drop takes place according to the "incidence angle equals reflection angle" principle symmetrically with respect to a normal vector on the surface. The direction of the incident light beam can be calculated from the sensor position by tracking the associated sight beam from the camera. However, since the distance between the surface and the camera is not known, the exact arrangement of the reflecting surface cannot be determined even if the light source position associated with the light reflection is known. However, it is possible to specify a plurality of normal vectors that are each associated with a possible distance of the reflecting surface and that describe the reflection of the light beam at this point. Therefore, a plurality of normal vectors that each describe a possible arrangement of a reflecting surface region can be calculated for each pair. If this calculation is performed for several pairs, a surface geometry that is consistent with all detected pairs can be determined based on the plurality of normal vectors arranged along the individual sight beams. The item of size information of the drop is then derived from this surface geometry.

In one embodiment, an assumed drop surface is varied and compared with the normal vectors calculated for the pairs in an optimization process in step (e). For example, normal vectors on the drop surface at the points of intersection with the sight beams can be calculated for each assumed drop surface. In the optimization method, the deviation of the normal vectors on the assumed drop surface from the normal vectors calculated from the pairs and describing the reflection is then minimized. In this way, the actual drop surface can be identified. This optimization process can provide very precise results. If reasonable assumptions are made with regard to the drop surface, the optimization process converges very quickly. The assumptions may relate to the position of the drop and to parameters determining the geometry of the drop surface, for example a center of the drop and a radius of the drop if the shape is assumed to be spherical. Under certain circumstances, even more precise results can be achieved if the geometry of the drop is assumed not to be spherical, in particular in consideration of a deformation of the drop geometry on account of the force of gravity. For example, the drop may be assumed to be elliptical.

In one embodiment, in order to calculate the position of the drop in step (e), points of intersection are calculated for planes that each comprise a light source position and a sight beam of the camera that corresponds to the sensor position associated with the light source position. A plane that comprises a sight beam of the camera as well as the light source position can be calculated based on one pair, i.e. a light source position and an associated sensor position. This plane is spanned by a vector along the sight beam and a vector from the camera to the light source position. The plane also contains the point on the drop surface at which the detected light reflection is produced by means of reflection on a drop surface. The normal vector at this point on the drop surface also lies in the calculated plane. At any rate, in the case of an approximately spherical drop, the center of the drop, which lies along the straight line represented by the normal vector on the drop surface, is then also located within the calculated plane. If several such planes can be calculated, the center of the drop, i.e. the position thereof, can therefore be derived from the point of intersection of the planes. As such, the position of the drop can be determined particularly easily under certain circumstances. An optimization calculation or specific assumptions regarding the arrangement of drop are not required.

In one embodiment, a contact angle of the drop is calculated in an additional calculation step on the basis of the quantities calculated in step (e). Proceeding, for example, from a spherical drop and a planar sample surface in the region of the drop, the contact angle can for example be calculated based on the center of the drop and an item of size information in the form of a radius of the drop. Depending on the assumptions made or the desired level of accuracy, other quantities that are assumed to be known or that are metrologically determined can be included in the calculation of the contact angle, in particular a volume of the drop, which can be predetermined by correspondingly precise dosing during application of the drop, or a distance between the sample surface and the measuring arrangement.

In one embodiment, additional light reflections of the light sources emanating from the drop are detected in step (c) using an additional camera, wherein a sensor position on a sensor of the additional camera is determined for each additional light reflection. As already mentioned, by using an additional camera or, if applicable, more than two additional cameras, this makes it possible to include a larger number of pairs of sensor positions and light source positions in the evaluation. As a result, greater accuracy and/or higher reliability can be achieved in the evaluation. A particular advantage is produced by the above-described calculation of the drop position based on planes that each comprise one light source position and one sight beam because, when several cameras are used, planes with angular positions that deviate more significantly from one another can be included in the evaluation.

In one embodiment, the camera and the additional camera have viewing directions that differ from one another by an angle of 10° or more. The angular distance may for example be 15° or more, 20° or more, or 30° or more. On account of this arrangement of the two cameras, the accuracy and/or reliability of the evaluation can again be improved.

In one embodiment, the light sources are arranged in a uniform manner around the drop. In principle, the light sources can be arranged in any desired manner around the drop. However, a uniform arrangement can help to detect clearly differentiable light reflections. In particular, the uniform arrangement can simplify the assignment of the light source positions to the light reflections, inter alia by using a template, as explained above.

In one embodiment, the arrangement of the light sources, viewed from the drop, covers a solid angle in the range of $\pi/8$ sr to $2\pi$ sr. The largest specified solid angle of $2\pi$ sr corresponds to a hemisphere. In principle, it is desirable to detect light reflections from points on the sphere surface that are as far as possible away from one another. Furthermore, the wider the solid angle range covered by the arrangement of the light sources, the better. However, the theoretically optimal range depends on the contact angle. In the case of very small contact angles, excessively large angular distances between the individual light sources quickly results in it no longer being possible to detect a light reflection from each light source. Experiments have shown that the abovementioned solid angle range is particularly suitable for most applications.

In one embodiment, the light sources comprise first light sources and second light sources, wherein the first light sources are smaller and/or arranged at shorter distances from one another than the second light sources. The distances at which the light sources are arranged from one another relate, in particular, to the angular distances, viewed from the drop. The use of different light sources is helpful, in particular in connection with different contact angles. In the case of small contact angles, the drops have relatively large radii of curvature. Only a relatively small field of light sources can then be imaged onto the camera's sensor by means of specular reflection from the drop surface. In this situation, it would be expedient to evaluate the light reflections coming from the first light sources. In the case of large contact angles, the drop has a relatively small radius of curvature and a wider angular range around the drop can be imaged onto the sensor of the camera by means of specular reflection from the drop surface. This makes it particularly expedient to use the second light sources. In summary, by using different light sources, the method can be suitably adapted to the relevant measuring task.

An embodiment of a device for analyzing the interaction between a surface of a sample and a liquid comprises an apparatus for applying a drop of a liquid at an application site on a sample surface, several light sources each arranged at a light source position in the surroundings of the application site, a camera comprising a sensor and oriented toward the application site and configured to detect light reflections of the light sources emanating from an applied drop, and an electronic evaluation apparatus. The electric evaluation apparatus is configured to determine a sensor position on the sensor of the camera for each detected light reflection, assign individual light source positions to individual sensor positions, such that pairs each of one sensor position and one associated light source position are provided, and calculate a position and an item of size information of an applied drop from the pairs.

The device is intended, in particular, to carry out the one or more embodiments of the disclosed method. The evaluation apparatus is connected to the camera and, if applicable, to an additional camera or several additional cameras. The evaluation apparatus may also be connected to the light sources and may in particular be designed to activate and deactivate same, or switch same on and off, individually and/or in groups. The device is adapted to the above-described embodiments of the method by means of an embodiment of the device features that corresponds to the respective method features, therefore in particular by designing the evaluation apparatus accordingly. For the features and advantages of the device, reference should be made to the explanations of the method given above, which apply mutatis mutandis.

BRIEF DESCRIPTION OF THE DRAWINGS

In the following, the invention will be explained in greater detail based on the exemplary embodiments shown in the figures, in which.

DETAILED DESCRIPTION OF THE INVENTION

Figure 1:
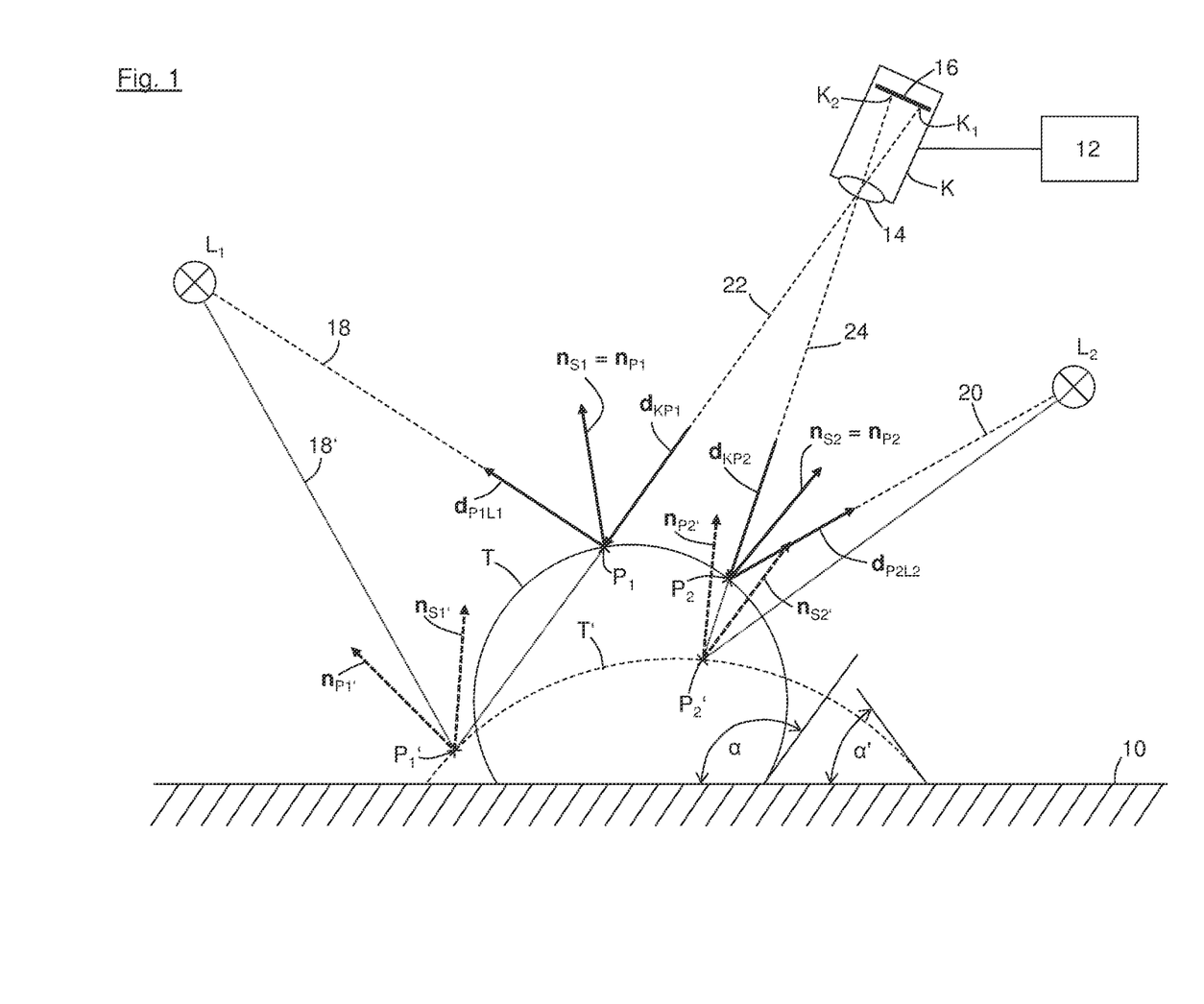
FIG. 1 illustrates a schematic representation of an embodiment of a device for analyzing an interaction between a surface of a sample and a liquid.

A sample with a sample surface 10 is shown shaded in on the bottom edge of FIG. 1. A drop T of a transparent liquid is located on the sample surface. The drop T is approximately spherical and rests on the sample surface 10 so as to form a contact angle $\alpha$. Said drop was applied to the sample surface 10 using a suitable dosing device.

The device by means of which the drop T is measured comprises two light sources $L_1$ and $L_2$, which are each located at a light source position, which are also referred to as $L_1$ and $L_2$ in the following. Furthermore, the device comprises a camera K and an evaluation apparatus 12 connected to the camera. The camera K is located at a rigidly defined position, also referred to as K in the following, relative to the two light sources L1 and L2. The evaluation apparatus 12 may in particular be a microcomputer integrated in the device or an external computer that is coupled to the remaining elements of the device, which may be grouped together as a measuring head. The camera K comprises a lens 14 and a sensor 16, which comprises a sensor surface onto which a field of view of the camera K is imaged by means of the lens 14.

The two light sources L1 and L2 are arranged such that they illuminate a surface of the drop T. A light beam 18 emanating from the light source L1 strikes a point P1 on the surface of the drop T, where it is reflected in a mirror-symmetrical manner with respect to a normal vector nP1. The light coming from the light source L1 and reflected at the point P1 is imaged onto the point K1 of the sensor 16. The camera K therefore detects a light reflection of the light source L1 at the sensor position K1. Similarly, the camera K detects a light reflection of the light source L2 at the sensor position K2. The reflection of the associated light beam 20 coming from the light source L2 takes place at the point P2 on the surface of the drop T, in a mirror-symmetrical manner with respect to the normal vector nP2.

The associated reflection point on the drop surface generally cannot be determined from a single light reflection and the associated sensor position. Following the camera sight beam 22 associated with the sensor position $K_1$, the light striking the sensor 16 along this sight beam 22 at the sensor position $K_1$ could come not only from the point $P_1$, but equally from any other point on the sight beam, for example from the point $P_1'$ if there were a specularly reflective surface described by the normal vector $n_{S1}$, present at this point. In this case, the light emanating from the light source $L_1$ would arrive at the point $P_1'$ along a beam 18'.

This ambiguity can be solved, for example, by incorporating several pairs of light source positions and sensor positions into the evaluation and comparing these with assumed surface geometries. This is illustrated in FIG. 1 using an assumed surface of another drop T', which is shown as a dashed line. However, the direction of the normal vector nP1', which describes the orientation of the surface of said drop T' at the point P1' at which the light beam 18' would have been reflected, deviates significantly from the direction of the unit vector nS1' describing the reflection. This deviation shows that the light striking the sensor position K1 cannot actually come from the surface of the assumed drop T'.

FIG. 1 also shows the hypothetical situation of a reflection of the light source L2 at the point P2' on the assumed drop T' using corresponding reference signs. In the case of an assumed reflection at this point P2', too, the normal vector nP2' on the surface of the drop T' at the point of intersection with the sight beam 24 deviates significantly from the unit vector nS2' describing the theoretically conceivable reflection. This shows that, when a sufficient number of pairs K1-L1, K2-L2, ..., K1-Li of individual sensor positions K1, K2, ..., Ki and associated light source positions L1, L2, ..., Li are used, it is possible to calculate whether or not an assumed drop geometry is consistent with the observed pairs. In this way, the position and an item of size information of the drop can be calculated for example in an optimization method.

Figure 2:
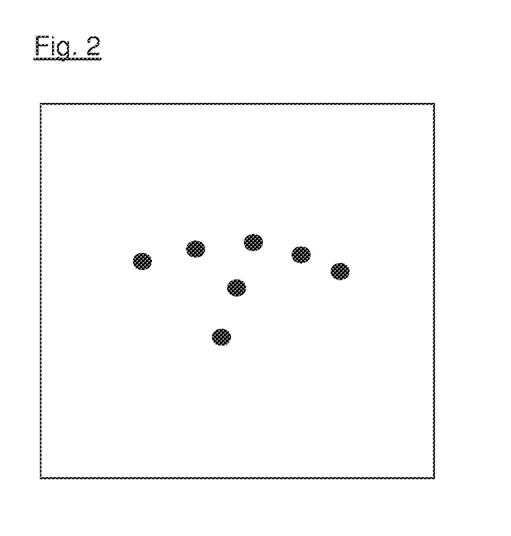
FIG. 2 illustrates an embodiment of a template.
Figure 3:
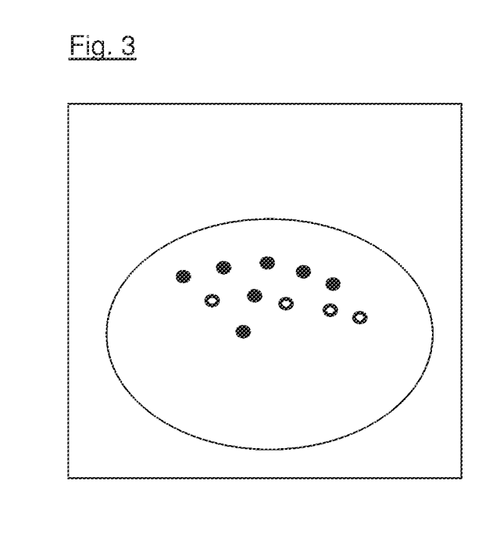
FIG. 3 illustrates a schematic representation of an example of an image captured by a camera of the device.

It is important for the method that the sensor positions K1, K2 of the detected light reflections can be clearly assigned to the individual light source positions L1, L2. In this regard, FIGS. 2 and 3 illustrate assignment with the aid of a template, which indicates the expected sensor positions of the light reflections. The template shows seven light reflections that are represented as filled-in circles and that are produced by seven light sources in a specific arrangement. The light reflections shown in the template are based on the assumption that the light beams emanating from these light sources are reflected on a typical drop.

FIG. 3 schematically shows an image captured by a camera K, in which the outline of the drop T is shown for illustrative purposes. In the real camera image, this outline is either hard to make out or, under certain circumstances, entirely indiscernible. The camera image also shows a total of eleven light reflections, of which seven are shown as filled-in circles. These come from the reflection on the drop T of the seven light sources on which the template is based. Their arrangement resembles that of the template in FIG. 2, and therefore, by means of comparison with the template, the light reflections detected by the camera and shown as filled-in circles in FIG. 3 can be assigned to the individual light source positions. The camera image in FIG. 3 also shows four other light reflections represented as circles that have not been filled in. These come either from other light sources that are not intended to be included in the evaluation or arise as a result of interfering multiple reflections, for example within the drop or on the surface of the sample. They have no equivalent in the template, and therefore they can simply be identified as interfering signals by comparing the camera image from FIG. 3 with the template from FIG. 2.

Figure 4:
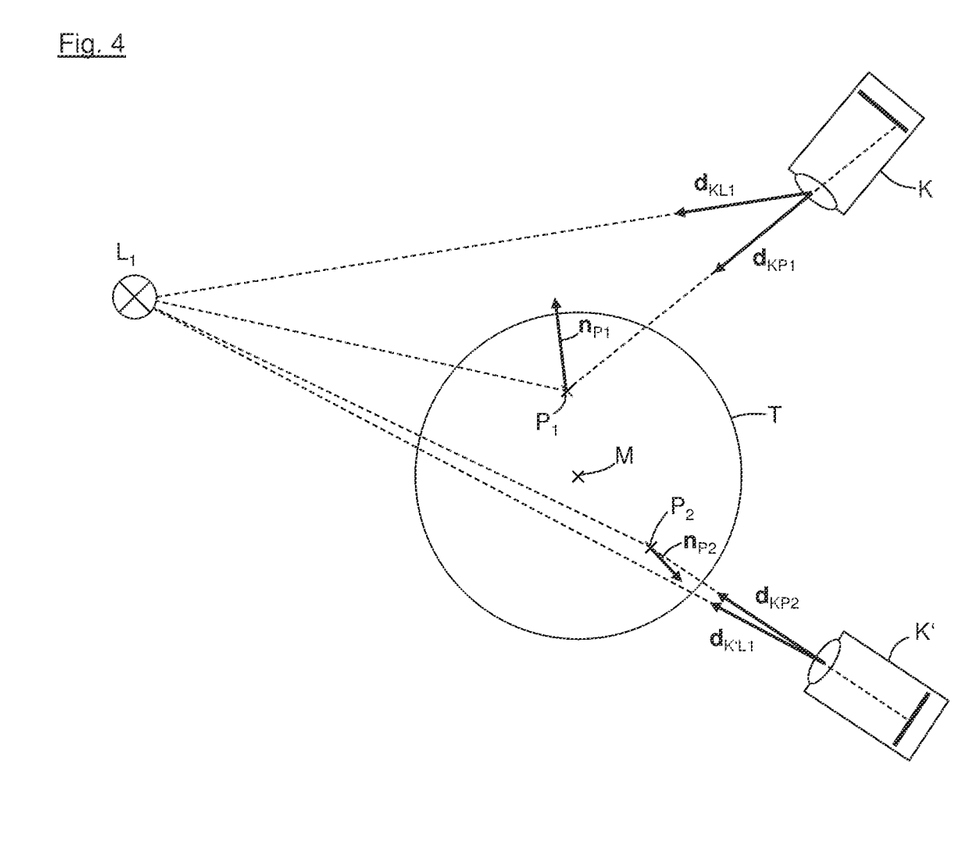
FIG. 4 illustrates a top view of a schematic representation of another embodiment of a device for analyzing the interaction between a surface of a sample and a liquid.

FIG. 4 is a schematic view from above of another device for characterizing a surface of a sample and comprising two cameras K and K'. Only one light source $L_1$ is shown in this figure. A drop T having a center M is also shown. In the representation in FIG. 4, the sample surface (not shown) is viewed approximately from above, and therefore the drop T appears as a full circle. A unit vector $d_{KL1}$ from the camera K to the light source $L_1$ is shown for the camera K, as is a unit vector $d_{KP1}$ that corresponds to the sight beam from the camera to a reflection point $P_1$ on the surface of the drop T. The two unit vectors $d_{KL1}$ and $d_{KP1}$ span a plane that comprises the sight beam of the camera K as well as the light source $L_1$. The normal vector $n_{nP1}$ on the surface of the drop T at the point $P_1$ as well as the center M also lie in this plane. The same applies to the plane spanned by the unit vectors $d_{K'L1}$ and $d_{K'P2}$, meaning that a line containing the center M can be determined from the intersection of the two planes. When at least one other light source or another camera is used, three planes that intersect in the center M of the drop are obtained. The calculation of the planes therefore provides information about the position of the drop T.

LIST OF REFERENCE SIGNS

10 Sample surface
12 Evaluation apparatus
14 Lens
16 Sensor
18 Light beam from $L_1$
20 Light beam from $L_2$
22 Sight beam $K_1$
24 Sight beam $K_2$
K Camera
K' Additional camera
$K_1$ Sensor position of the light reflection from $L_1$
$K_2$ Sensor position of the light reflection from $L_2$
$L_1$ Light source
$L_2$ Light source
$P_1$, $P_2$ Points on the surface of the drop T
T Drop
T' Assumed drop
$P_1'$, $P_2'$ Points on the surface of the assumed drop T'
M Center
α, α' Contact angle

The invention claimed is:

1. A method for analyzing an interaction between a sample surface and a drop of liquid, the method comprising:
   (a) applying the drop of liquid to the sample surface;
   (b) illuminating the drop of liquid using at least two light sources, wherein each of the at least two light sources is arranged at a light source position surrounding the drop of liquid;
   (c) detecting light reflecting from the drop of liquid;
   (d) determining a sensor position on a sensor of a camera for each detected light reflection;
   (e) assigning individual light source positions to individual sensor positions, such that at least four pairs each of one sensor position and one associated light source position are provided; and
   (f) calculating a position of the drop of liquid relative to the sensor and an item of size information of the drop of liquid, wherein the position and the item of size information are calculated from the at least four pairs of one sensor position and one associated light source position.

2. The method according to claim 1, wherein the at least two light sources are formed by discrete lamps.

3. The method according to claim 1, wherein the light sources comprise first light sources and second light sources, and wherein the first light sources are smaller than the second light sources.

4. The method according to claim 1, wherein the light sources comprise first light sources and second light sources, and wherein the first light sources are positioned at a shorter distance from one another than the second light sources.

5. The method according to claim 1, wherein the detecting light reflections and the determining the sensor position are repeated for individual light sources and for different groups of individual light sources.

6. The method according to claim 5, wherein the individual light source is contained in at least two of the different groups of individual light sources.

7. The method according to claim 1, wherein additional light reflections from the drop of liquid are detected using an additional camera, and wherein a sensor position on a sensor of the additional camera is determined for each additional light reflection.

8. The method according to claim 7, wherein the camera and the additional camera include viewing directions that differ from one another by an angle of at least 10°.

9. The method according to claim 1, wherein the light sources are uniformly positioned around the drop of liquid.

10. The method according to claim 9, wherein the positions of the light sources when viewed from the drop of liquid cover a solid angle in range of $\pi/8$ sr to $2\pi$ sr.

11. A method for analyzing an interaction between a sample surface and a drop of liquid, the method comprising:
(a) applying the drop of liquid to the sample surface;
(b) illuminating the drop of liquid using at least two light sources, wherein each of the at least two light sources is arranged at a light source position surrounding the drop of liquid;
(c) detecting light reflecting from the drop of liquid;
(d) determining a sensor position on a sensor of a camera for each detected light reflection;
(e) assigning individual light source positions to individual sensor positions, such that pairs each of one sensor position and one associated light source position are provided;
(f) calculating a position of the drop of liquid relative to the sensor and an item of size information of the drop of liquid, wherein the position and the item of size information are calculated from the pairs of one sensor position and one associated light source position; and
(g) creating a template showing expected sensor positions of the light reflections based on the light source positions, wherein the detected light reflections are compared with the template prior to the calculating a position of the drop of liquid relative to the sensor and an item of size information of the drop.

12. A method for analyzing an interaction between a sample surface and a drop of liquid, the method comprising:
(a) applying the drop of liquid to the sample surface;
(b) illuminating the drop of liquid using at least two light sources, wherein each of the at least two light sources is arranged at a light source position surrounding the drop of liquid;
(c) detecting light reflecting from the drop of liquid;
(d) determining a sensor position on a sensor of a camera for each detected light reflection;
(e) assigning individual light source positions to individual sensor positions, such that pairs each of one sensor position and one associated light source position are provided; and
(f) calculating a position of the drop of liquid relative to the sensor and an item of size information of the drop of liquid, wherein the position and the item of size information are calculated from the pairs of one sensor position and one associated light source position,
wherein the calculating the position of the drop of liquid relative to the sensor and an item of size information of the drop of liquid comprises calculating a plurality of normal vectors describing possible arrangements of a reflecting surface region for each of the pairs.

13. The method according to claim 12, wherein an assumed drop surface is varied and compared with the normal vectors calculated for the pairs in an optimization process.

14. The method according to claim 13, wherein calculating the position of the drop of liquid comprises calculating points of intersection for planes that each comprise a light source position and a sight beam of the camera that corresponds to the sensor position associated with the light source position.

15. The method according to claim 13, wherein a contact angle of the drop of liquid is calculated using the calculated position of the drop of liquid and the item of size information.

16. A device for analyzing an interaction between a sample surface and a drop of liquid, the device comprising:
an apparatus configured to apply the drop of liquid at an application site on the sample surface;
a plurality of light sources each arranged at a light source position surrounding the application site and configured to illuminate the drop of liquid;
a camera comprising a sensor and oriented toward the application site, wherein the camera is configured to detect light reflecting from the drop of liquid; and
an electronic evaluation apparatus configured to,
determine a sensor position on the sensor of the camera for each detected light reflection,
assign individual light source positions to individual sensor positions, wherein at least four pairs each of one sensor position and one associated light source position are provided, and
calculate a position of the drop of liquid relative to the sensor and an item of size information of the drop of liquid, wherein the position and the item of size information are calculated from the at least four pairs.

* * * * *